United States Patent Office 3,429,457
Patented Feb. 25, 1969

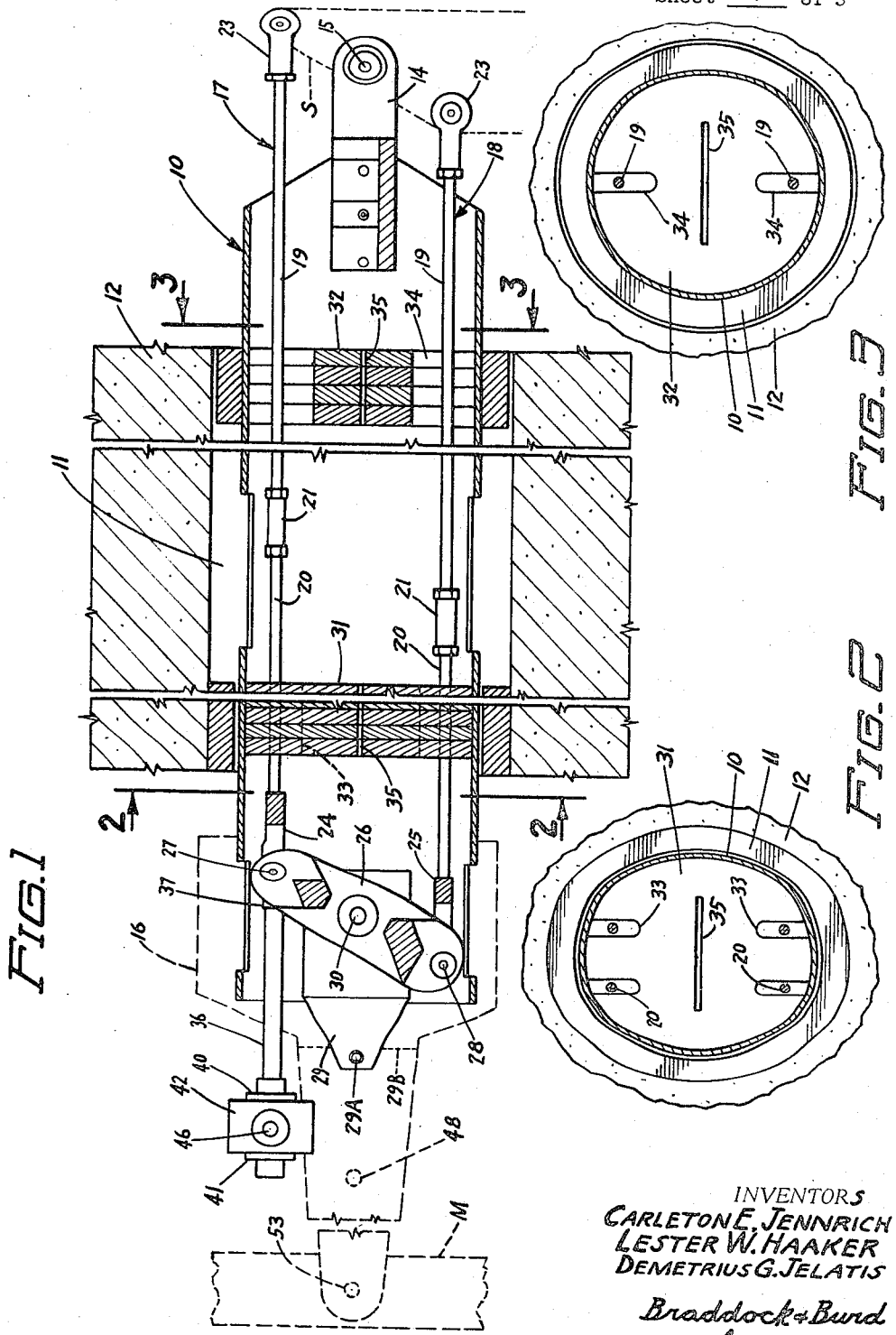

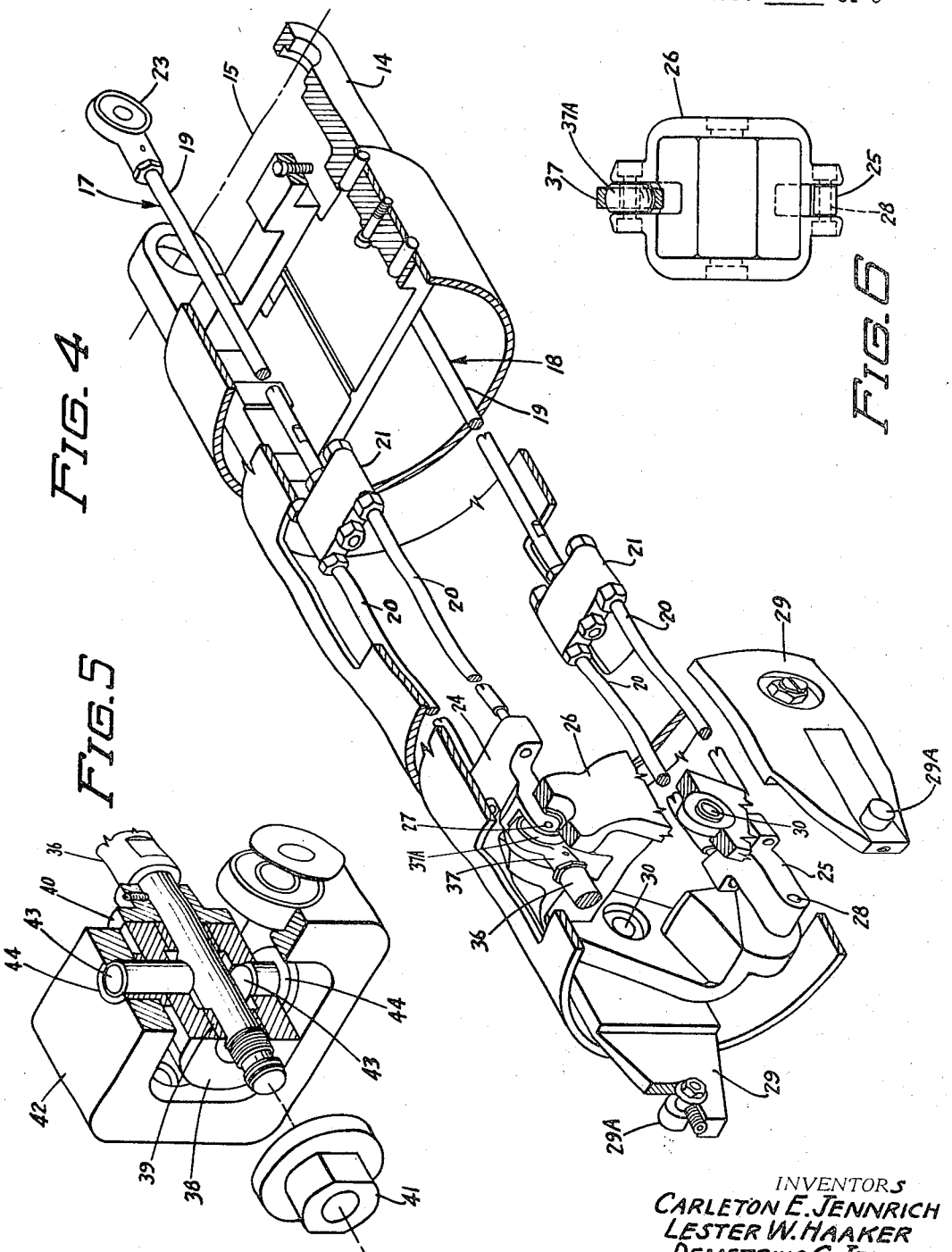

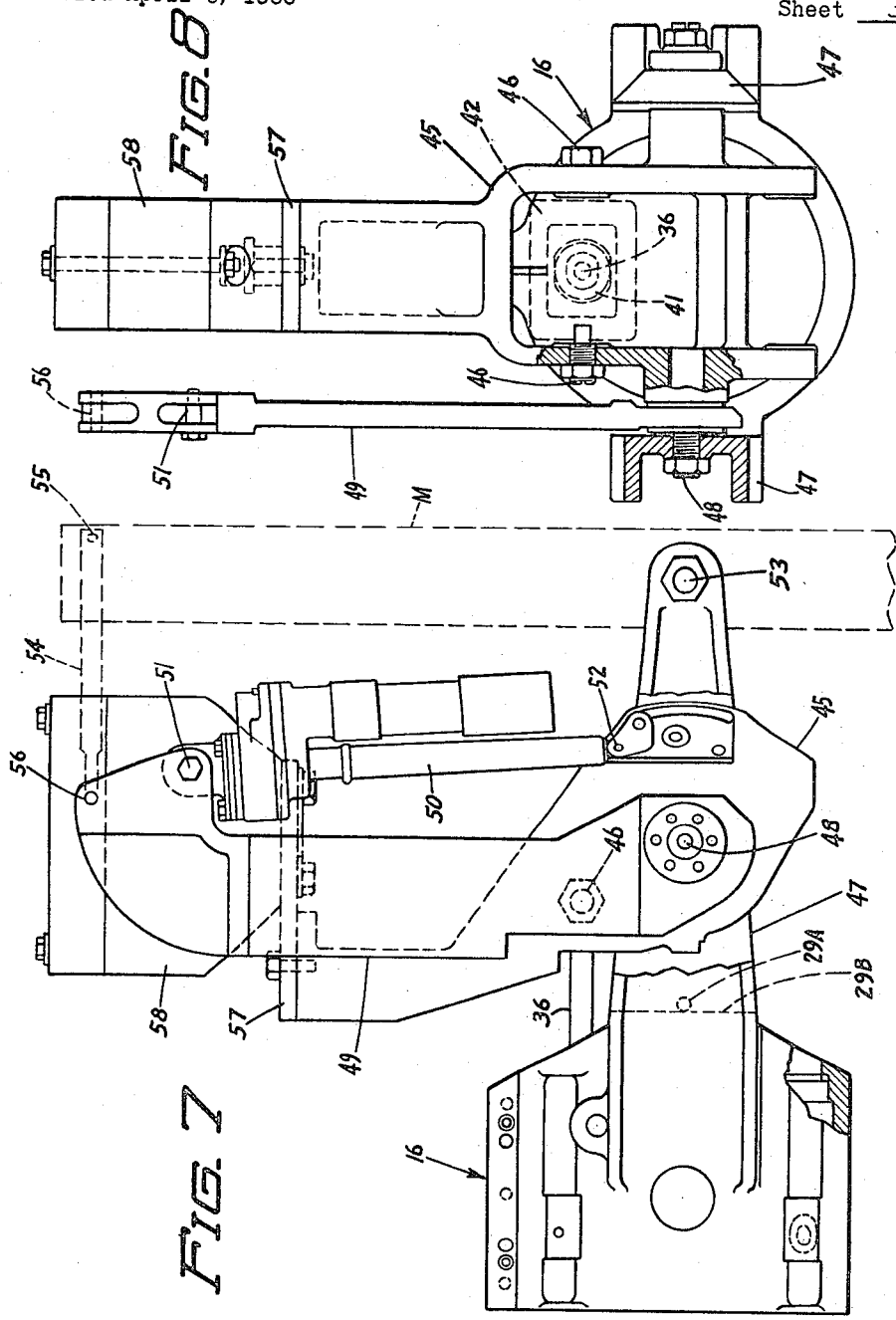

3,429,457
MASTER PIVOT ROCKER ASSEMBLY
Carleton E. Jennrich, St. Paul, and Lester W. Haaker
and Demetrius G. Jelatis, Red Wing, Minn., assignors to
Central Research Laboratories, Inc., Red Wing, Minn.,
a corporation of Minnesota
Filed Apr. 8, 1966, Ser. No. 541,283
U.S. Cl. 214—1                                 10 Claims
Int. Cl. B25j 3/00

This invention relates to a remote-control master-slave manipulator of the type used to perform work on one side of a barrier wall in response to movements performed by an operator on the opposite of that barrier. More particularly, this invention relates to such manipulators provided with means for introducing relative lateral rotation or side canting of the slave arm of the manipulator with respect to the master arm, such as disclosed generally in United States Patent No. 2,888,154 of Jelatis et al. granted May 26, 1959.

The most common use of such manipulators is in the handling of radioactive materials in a dangerous area on one side of a barrier wall. The hazardous rays and particles emitted from such dangerous substances as may be handled with the manipulator tend to travel along straight line paths of varying lengths. In order to prevent endangering of personnel due to the escape of harmful radioactive products, such as gamma radiation, through the openings in the barrier wall through which the manipulator extends and through the manipulator itself, shielding means may be provided to minimize or eliminate any straight line paths by which harmful radiation can escape to the safe side of the barrier wall.

In copending application Ser. No. 529,059 there is shown a labyrinth shielding system for the interior of the horizontal through tube of a manipulator which is mounted in a sleeve or tube set in a barrier wall. This labyrinth shielding comprises a plurality of transverse plates or slabs of radiation absorptive material having a combination of horizontal and vertical slots therein for passage of the rods, tapes, cables, chains, belts or the like, by which linear motion is transmitted through the horizontal support tube. These slots are desirably staggered to eliminate any open straight line path through the horizontal support. (Reference to "horizontal" and "vertical" in the description of any movable parts is with respect to directions when the manipulator is in normal "at rest" position.) The slots in the shielding elements for passage of linear motion transmission members are made as narrow as possible to minimize the area of the openings, while at the same time permitting free passage of the linear motion transmission members through the slots.

Because lateral rotation of one of the manipulator arms relative to the other imparts a twisting displacement of the linear motion transmission members, effective use of labyrinth shielding inside the manipulator through tube presents difficulties which are solved by the present invention. Flexible linear motion transmission members, such as tapes and cables, can themselves be partially twisted to accommodate the displacement so that they will pass through the passages in the shielding assemblies with relative ease. However, in the case of rigid members, such as the tie rods by which the arms of the manipulator are interconnected for angular movements about their pivots at the ends of horizontal support (or Y motion), the vertical slots must be so enlarged to permit lateral rotation that the effectiveness of the shielding is materially reduced. The present invention obviates this latter objection by providing a modified master pivot rocker assembly separating lateral rotation motion from the Y motion tie rods allowing use of labyrinth shielding inside the manipulator through tube with lateral rotation.

The invention is illustrated by the accompanying drawings in which the same numerals are used to identify corresponding parts and in which:

FIGURE 1 is an elevation in section of a horizontal through tube and tie rod assembly for use with labyrinth type shielding;

FIGURE 2 is a vertical section on the line 2—2 of FIGURE 1 and in the direction of the arrows;

FIGURE 3 is a further vertical section on the line 3—3 of FIGURE 1 and in the direction of the arrows;

FIGURE 4 is an isometric view, with parts broken away for clarity, of the horizontal through tube and tie rod assembly of FIGURE 1;

FIGURE 5 is an isometric view, with parts broken away for clarity, of a swivel assembly through which the tie rod assembly is connected to the master arm ear and pivot assembly;

FIGURE 6 is an elevation of a rocker member comprising part of the tie rod assembly;

FIGURE 7 is a side elevation of the master ear and pivot rocker assembly; and

FIGURE 8 is an end elevation of that assembly.

Referring now to the drawings, as is well understood in the art the horizontal support or through tube 10 of a remote control master slave manipulator extends through an opening 11 in a barrier wall 12. The barrier wall separates the area from which an operator moves the master end of the manipulator (on the left hand side as seen in FIGURE 1) from the area in which the slave end of the manipulator performs work. As is well understood, the tube 10 is mounted for rotation about its longitudinal axis, for example, by means of roller truck mounts such as shown and described in copending application Ser. No. 529,057, or other means known for that purpose.

Ear frame 14 is rigidly secured to one end of through tube 10 to provide a slave pivot axis 15 about which the slave arms rotates in Y motion in response to corresponding movement of the master arm M. A master ear frame 16, to be described in greater detail below, is mounted on the opposite end of through tube 10.

Transmission of Y motion is by means of upper and lower tie rod assemblies 17 and 18, respectively. Each tie rod assembly includes a single slave tie rod 19 each connected at one end to a parallel pair of master tie rods 20 through a tie rod branch member 21. The tie rods are desirably threaded at their ends and secured by means of nuts, as shown, or other equivalent fastening means. The opposite end of each slave tie rod is provided with an end fitting 23 for pivotal attachment of the tie rods to the slave arm as is understood in the art.

The ends of the pairs of master tie rods 20 of the upper tie rod assembly 17 are secured in an upper tie rod terminal 24. The ends of master tie rods 20 of the lower tie rod assembly 18 are similarly secured in a lower tie rod terminal 25. Terminals 24 and 25 are pivotally secured in a rocker member 26 for relative rotation about axes 27 and 28, respectively. Rocker 26 in turn is pivotally mounted between a pair of spaced rocker mounts 29 for relative rotation about axis 30. Rocker mounts 29 are rigidly secured to the master arm end of through tube 10. The upper and lower ends of rocker 26 are preferably bifurcated to receive tongue-like projections of the upper and lower tie rod terminals. Rocker 26 is provided with a central opening for passage of flexible linear motion transmission elements.

At least two labyrinth shielding assemblies 31 and 32, according to copending application Ser. No. 529,059, are disposed inside the manipulator through tube 10. As best seen in FIGURE 2, the elements of shielding assembly 31 are each provided with two pair of spaced apart parallel vertical slots 33 to permit simultaneous longitudinal and vertical movement of upper and lower pairs of master tie rods 20. As best seen in FIGURE 3, the elements of shielding assembly 32 are each provided with centrally disposed vertical slots 34 for simultaneous longitudinal and vertical movement of upper and lower slave tie rods 19. It will be seen that the slots 33 are offset on opposite sides of a vertical center line so that there is no straight line passage through the through tube 10 which can extend through the tie rod passages 33 and 34 through the shielding elements. Both shielding assemblies are provided with a centrally disposed horizontal slot 35 for passage of flexible linear motion transmission members (not shown).

Tie rod terminal axes 27 and 28 and rocker axis 30 lie in a plane which is parallel to the plane extending through slave pivot axis 15 and the pivotal axes through which slave tie rod fittings 23 are attached to the slave arm. Thus, rotation of rocker 26 about axis 30 causes a simultaneous retraction of one tie rod assembly and extension of the other tie rod assembly resulting in a corresponding rotation of the slave arm about its axis 15.

Rocker 26 is moved about its axis 30 through its interconnection with the master arm through tie rod 36. One end of the tie rod 36 is pivotally connected to rocker 26 through a fitting 37 for relative movement about axis 27 along the master tie rod terminal 24. The tongue-like portion of master tie rod terminal 24 is bifurcated to receive tie rod fitting 37 between its arms. The interior spherical surfaces of fitting 37 embrace a truncated sphere or ball 37A which is held between the arms of master tie rod terminal 24 by a pin on the tie rod axis 27. Fitting 37 is free to rotate universally relative to ball 37A. The opposite end of tie rod 36 extends longitudinally through a central passage in a swivel body 38, journalled for rotation about its own longitudinal axis in a pair of spaced apart bearings 39. The end of tie rod 36 is retained in swivel body 38 by means of thrust bearings 40 and 41, the latter desirably being threaded to fit the threaded end of the tie rod.

Swivel body 38 is pivotally mounted in swivel frame 42 in a central horizontally extending opening therein by means of a pair of vertically aligned dowel pins 43 each journalled in a bearing 44 in the top and bottom walls, respectively, of the swivel frame 42. Thus, it will be seen that swivel block 38 may rotate about the longitudinal axis of the tie rod 36 and may also rotate about the axis of pins 43 relative to swivel frame 42. Swivel frame 42 in turn is pivotally mounted within pivot rocker arm 45 for relative rotation about the axis of pivots 46. Pivot rocker arm 45 is pivotally mounted between the ears 47 of the master ear frame 16 which is secured to the end of through tube 10 for rotation about a horizontal axis 48.

A pivot arm 49 is journalled for rotation about axis 48 independent of rotation of pivot rocker arm 45 about the same axis. Although journalled for independent rotation about axis 48, pivot rocker arm 45 and rocker arm 49 are also linked together for rotation together. An actuator 50, which is desirably in the form of an electrically operated screw jack or the like, is pivotally connected at one end at 51 to pivot arm 49 and is pivotally connected at the opposite end at 52 to pivot rocker arm 45. Actuator 50 functions as a variable length link interconnected the pivot rocker arm 45 and pivot arm 49.

As is well understood, the master arm M indicated in phantom lines is pivoted for rotation about axis 53 in the master ears 47. Movement of the master arm about the master pivot axis 53 is transmitted to pivot arm 49 and thence through actuator 50 to pivot rocker arm 45 through a parallelogram linkage. One end of a link 54 is pivotally connected at 55 to the upper end of the master arm and link 54 is pivotally connected at its opposite end at 56 to the upper end of pivot arm 49. Thus, movement of the master arm about the master pivot 53 causes a corresponding movement of pivot arm 49 about pivot 48 which is transmitted through the linkage of actuator 50 to pivot rocker arm 45 and thence through the swivel assembly and tie rod 36 to rocker 26 and through tie rod assemblies 17 and 18 to the slave arm.

A pair of cam follower bearings 29A each disposed in the end of one of the rocker mounts 29 serve to hold the master ear frame 16 on the through tube. Each bearing 29A engages the outwardly facing surface 29B of a shoulder on the inside surface of each ear 47 to constrain the master ear from casting from longitudinal movement relative to the through tube. Limited rotation of the master ear frame casting about the end of the through tube is permitted.

Extension of actuator 50 causes rotation of pivot rocker arm 45 relative to pivot arm 49 which is transmitted through the swivel assembly to rocker 26 and through tie rod assemblies 17 and 18 to the slave arm. This permits the slave arm to be indexed in Y motion relative to the master arm.

The slave arm is counterbalanced in its Y motion by means of a cantilever weight 58 of appropriate mass supported on a cantilever weight mounting plate 57 secured to the top end of rocker pivot arm 45.

Relative lateral rotation or side canting of the slave arm of the manipulator with respect to the master arm is accomplished by relative rotation of the cylindrical casting of the master ear frame 16 and the through tube 10 about their common longitudinal axis. Tie rod 36 adjusts to this relative twisting of parts because of the flexibility of its connection at each end. Universal movement of one end of tie rod 36 is permitted by swivel body 38 pivoted in swivel frame 42 which in turn is pivotally mounted within rocker arm 45. The opposite end of tie rod 36 may move universally through the socket and ball joint 37, 37A connecting the tie rod to rocker 26.

By means of the modified structure according to the present invention the lateral rotation motion is separated from the Y motion tie rods. The tie rods are not skewed or twisted. This permits for the first time the use of labyrinth shielding inside the horizontal manipulator through tube with lateral rotation or side canting.

The use of a pair of pre-loaded tensile members, upper and lower tie rod assemblies 17 and 18, respectively, provides a good rigid linkage between the master and slave arms in Y motion with parts of small cross section which facilitates shielding. It has the desirable feature of eliminating lost motion in six pivot bearings, the two rocker pivots and the pivots at the ends of the tie rods.

The problems introduced by the lateral indexing are not only the difficulty of shielding, but also an accompanying elongation of the tie rod which normally results in nothing worse than an acceptable increase in tensile pre-loading since the lateral displacement of the tie rods ends in a small fraction of their length. As soon as the Y linkage is divided into two parts with the relatively longer part in the through tube restricted in one plane of improved shielding, while the relatively short part at the master end is required to accommodate all of the twist resulting from lateral indexing, then the length increment in the skewed links becomes too large to be accommodated by elastic elongation with acceptable tensile forces. To avoid the excess constraint on a pair of short skewed tensile links, one member is eliminated and the other is used as a rigid strut (link 36) which then has to transmit push as well as pull forces.

This skewable push-pull strut represents an engineering compromise that introduces two undesirable characteristics: first, lateral indexing of the slave arm is accompanied by a small Y indexing motion, and second, any free play in the universal couplings of the strut add directly to loss motion or backlash in the Y motion. The defects can be tolerated because the undesired motion cross coupling is so small as to be generally undetectable to an operator and because careful fitting of the strut and couplings can keep the lost motion down to an acceptable level.

It is apparent that many modifications and variations of this invention as hereinbefore set forth may be made without departing from the spirit and scope thereof. The specific embodiments described are given by way of example only and the invention is limited only by the terms of the appended claims.

We claim:

1. In a remote control master-slave manipulator comprising a horizontal tubular support, a master arm assembly and a slave arm assembly connected to the respective ends of said support for pivotal movement of the master and slave arms with respect to the support, link means interconnecting said arms for causing the arms to pivot conjointly with respect to the support, and means for causing relative lateral rotation of said slave arm outside of the plane defined by the longitudinal axes of said tubular support and said master arm, the improvement which consists in means for dividing the longitudinal motion of said interconnecting link means whereby, when said slave arm is rotated laterally relative to the master arm, a longitudinal twisting motion is imparted to one segment of said interconnecting link means which is connected to said master arm assembly and the remainder of said link means extending to said slave arm is maintained free from twisting.

2. A manipulator according to claim 1 further characterized in that said means for dividing the longitudinal motion of said interconnecting link means comprises a rigid segment of said link means universally pivoted at one end to the master arm assembly and connected at the other end to the remainder of said link means extending to said slave arm.

3. A manipulator according to claim 2 further characterized in that said universally connected rigid segment of said link means includes a push-pull tie rod connected at one end through a universal joint to the master arm assembly and connected at the other end through a universal joint to a rocker member pivotally supported in the horizontal tubular support and pivotally connected to the remainder of said link means.

4. A manipulator according to claim 1 further characterized in that
(A) said link means includes
  (1) a rocker member pivotally supported in said horizontal tubular support,
  (2) at least one elongated tie rod assembly in said support pivotally connected at one end to said rocker member and pivotally connected at the other end to said slave arm assembly and
  (3) a shorter tie rod extending from said rocker member to said master arm assembly,
(B) said master arm assembly includes
  (1) a master ear frame rotatably mounted on one end of said horizontal tubular support,
  (2) a master arm pivotally supported between the ends of said ear frame,
  (3) a pivot rocker arm pivotally supported in said ear frame intermediate of the master arm and said support, and
  (4) connecting means between the master arm and said pivot rocker arm for causing said parts to pivot conjointly relative to said master ear frame, and
(C) said means for dividing the longitudinal motion of the link means includes
  (1) a universal connection between the end of said shorter tie rod and said pivot rocker arm and
  (2) a further universal connection between the opposite end of said shorter tie rod and said rocker member in said support.

5. A manipulator according to claim 4 further characterized in that each of said tie rod assemblies includes
(A) a terminal pivotally secured to said rocker member,
(B) a branch member spaced longitudinally within the tubular support from the terminal and disposed intermediate of the ends of said tubular support,
(C) a spaced apart parallel pair of rigid tie rods extending between said terminal and said branch member, and
(D) a single tie rod displaced laterally relative to both of said parallel pair of tie rods and extending from said branch member to the slave arm of the manipulator.

6. A manipulator according to claim 5 further characterized in that said horizontal tubular support is provided with labyrinth shielding including
(A) a first transversely extending shielding assembly disposed in said tubular support between said tie rod terminal and said branch member and having a pair of vertically extending slots therethrough for passage of each of said parallel pair of tie rods, and
(B) a second transversely extending shielding assembly in said tubular support between said tie rod branch member and the slave arm end of the support and having a central vertically extending slot therethrough for passage of each of said single tie rods.

7. A manipulator according to claim 4 further characterized in that
(A) the end of said shorter tie rod connected to the master arm assembly is secured in a swivel body for rotation relative thereto about its own longitudinal axis,
(B) said swivel body is pivotally mounted in a swivel frame for rotation relative thereto about a vertical axis disposed perpendicular to said first named axis, and
(C) said swivel frame is pivotally mounted within said pivot rocker arm for rotation relative thereto about a horizontal axis disposed perpendicular to both of said earlier named axes.

8. A manipulator according to claim 4 further characterized in that
(A) said rocker member is pivotally supported in said tubular support for rotation relative thereto about a generally horizontal axis disposed perpendicular to the longitudinal axis of the support,
(B) said tie rod assemblies are pivotally connected to said rocker member for rotation relative thereto about axes parallel to the axis of rotation of the rocker member,
(C) said shorter tie rod is pivotally connected to said rocker member for rotation relative thereto about a common axis with a tie rod assembly, and
(D) said shorter tie rod is connected to said rocker member for universal rotation relative thereto about other axes having a common center with said common axis.

9. A manipulator according to claim 6 further characterized in that one of the spaced apart pair of parallel tie rod assemblies is pivotally connected to said rocker member for rotation relative thereto on an axis parallel to and spaced from the axis of rotation of said rocker member relative to said tubular support on a side that is opposite the side on which the other tie rod assembly is pivotally mounted.

10. A manipulator according to claim 9 further characterized in that said rocker member is provided with a central opening between the points of pivotal attachment of said rocker member to said horizontal tubular support for passage of linear motion transmission elements therethrough independent of rocking motion of said member and each of said shielding assemblies is provided with a narrow longitudinal horizontal slot for passage of said linear motion transmission elements.

References Cited

UNITED STATES PATENTS

| | | | |
|---|---|---|---|
| 2,764,301 | 9/1956 | Goertz et al. | 214—1 |
| 2,771,199 | 11/1956 | Jelatis | 214—1 |

GERALD M. FORLENZA, *Primary Examiner.*

GEORGE F. ABRAHAM, *Assistant Examiner.*